United States Patent Office

3,392,183
Patented July 9, 1968

3,392,183
PREPARATION OF BIURET POLYISOCYANATES
Erwin Windemuth, Otto Bayer, Kuno Wagner, and Wilhelm Bunge, Leverkusen, Germany, assignors to Farbenfabriken Bayer Aktiengesellschaft, Leverkusen, Germany, a German corporation
No Drawing. Filed Jan. 29, 1964, Ser. No. 341,090
Claims priority, application Germany, Feb. 8, 1963,
F 38,959
4 Claims. (Cl. 260—453)

This invention relates to organic polyisocyanates and more particularly to a process for the preparation of biuret polyisocyanates. Still more particularly, this invention provides a new and unexpected way of preparing different isocyanates without by-products.

It has been proposed heretofore to prepare biuret polyisocyanates, for exemple, according to the method of German Patent 1,101,394 by reacting organic diisocyanates with water or hydrogen sulphide. The heretofore known methods for the preparation of biuret polyisocyanates lead to by-products including carbon dioxide and carbon disulphide and the like which must be removed from the reaction mixture. The resulting polyisocyanates contain biuret groups in the molecule and have many advantageous properties for the production of polyurethane plastics. For example the biuret polyisocyanates may be reacted with a polyhydroxyl compound to prepare a cross-linked product which has good durability when subjected to organic solvents and excellent dimensional stability at elevated temperatures. Moreover, the biuret polyisocyanates are improved over the polyisocyanates based on organic diisocyanates and trihydric or higher polyhydric alcohols such as trimethylol propane or glycerol reacted in such proportions that there is one mol of diisocyanate per hydroxyl group of the alcohol.

It has been proposed heretofore to react a monoisocyanate with a monoamine to first prepare a urea which is then further reacted with isocyanate. It has also been proposed in German Patent 883,504 to react amines with isocyanates to prepare a reaction mixture having a high isocyanate content. The heretofore known processes resulted only in condensation products which could be hardened by heating and thus could be used for the production of coatings or baked enamels for wire coating.

It is therefore an object of this invention to provide an improved process for the production of biuret polyisocyanates. Another object of this invention is to provide a process for the preparation of biuret polyisocyanates where a balance of useful materials is obtained without the formation of useless by-products. Another object of this invention is to provide a method of simultaneously preparing a biuret polyisocyanate and a low molecular weight volatile organic monoisocyanate. Still another object of this invention is to provide a process for the preparation of biuret polyisocyanates which are highly compatible with organic compounds containing active hydrogen containing groups. A further object of this invention is to provide a process for the preparation of biuret polyisocyanates containing at least three —NCO groups per molecule which are substantially free of gaseous contaminants.

The foregoing objects and others are accomplished in accordance with the invention, generally speaking, by providing a process for the preparation of biuret polyisocyanates wherein an organic polyisocyanate is reacted with an organic primary amine in such proportions that the —NCO to —NH$_2$ ratio is at least three and at an elevated temperature with the continuous removal of the organic monoisocyanate formed in the reaction. It is an essential condition for this reaction to take place that the organic monoisocyanate is continuously removed substantially as soon as it is formed. This can be achieved by operating at elevated temperature, at reduced pressure or by using a carrier gas to remove the organic monoisocyanate from the reaction mixture substantially as soon as it is formed. It is convenient in most cases to operate at a temperature, based on relative boiling points of the resulting biuret polyisocyanate and the more volatile organic monoisocyanate so that the latter is continuously distilled from the reaction mixture. The resulting organic polyisocyanates preferably have the following formulas:

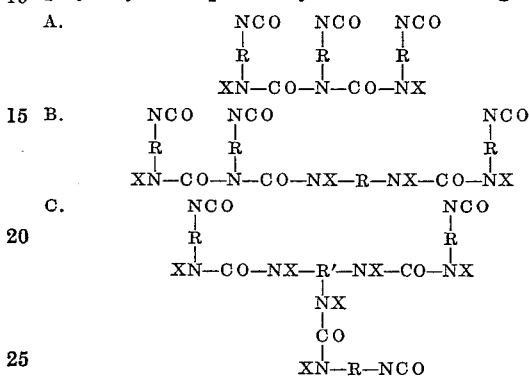

In these formulas, R is a divalent organic radical and R' is a divalent organic radical and R' is a trivalent organic radical. R and R' may be simple or mixed and they may be substituted or contain hetero atoms. The organic radicals represented by R and R' are obtained by the removal of the —NCO groups from a di- or triisocyanate respectively. Specific examples of the radicals represented by R and R' are those radicals obtained when the —NCO groups are removed from the specified organic di- and triisocyanates set forth below. The substituent X in the foregoing formulas may be hydrogen or another

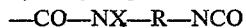

group. A product of Formula A may be obtained by reacting three mols of an organic diisocyanate with one mol of an amine R''—NH$_2$ wherein R'' is an organic radical, preferably having 1 to 6 carbon atoms and specifically, the organic radicals obtained by removing the —NH$_2$ groups from the primary amines or their salts set forth below. The ratio of —NCO to —NH$_2$ in this process for the preparation of a product having Formula A is therefore 6. The biuret polyisocyanate having Formula B may be obtained by reacting 4 mols of an organic diisocyanate with 2 mols of an amine R''NH$_2$, the ratio of —NCO to —NH$_2$ in this case being 4. The biuret polyisocyanate having Formula C may be obtained by reacting a minor proportion, for example, one mol of an organic triisocyanate with a major proportion, for example, three mols of an organic diisocyanate with three mols of an amine R''NH$_2$, the ratio of —NCO to —NH$_2$ in this case being three. The process in each case always produces a corresponding amount of a monoisocyanate having the formula R''NCO wherein R'' has the meaning set forth above but this compound must be continuously removed from the reaction mixture substantially as soon as it is formed. According to the preferred method of carrying out the invention and in order to provide the most desirable ratios of starting amine to starting polyisocyanate and to insure a smooth and complete reaction, the starting components are used in such a ratio that the —NCO to —NH$_2$ ratio is at least 6.

The course of the reaction is not completely understood but what presumably takes place is that a disubstituted urea isocyanate (III) is first formed from an organic monomer diisocyanate (I) and a primary monomeric monoamine (II) in accordance with the reaction scheme given below by way of example, this urea isocyanate then reacting with a second molecule of diisocyanate (I) form a trisubstituted biuret diisocyanate (IV). When a third molecule diisocyanate (I) reacts on this product, in this phase always at elevated temperature, a monoisocyanate (V) is split off and a urea diisocyanate is formed as an intermediate product which then reacts further with diisocyanate to form a polyisocyanate with biuret structure (VI) which corresponds to the above Formula A.

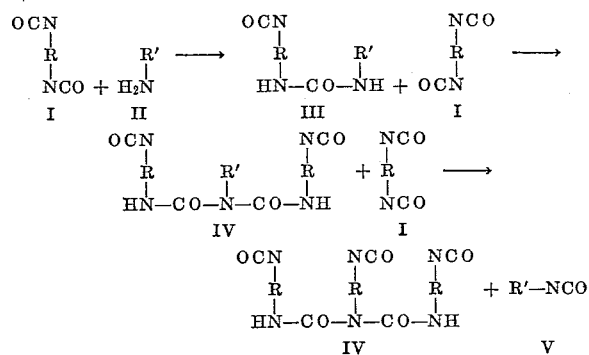

The reaction of amines with an excess of polyfunctional isocyanates with the aim of producing condensation products containing isocyanates groups is described also in German patent specification 883,504. According to the method indicated there, the splitting off of monoisocyanates is not observed. On the other hand, it is found according to this invention such splitting occurs only when the monoisocyanate is removed substantially as soon as it is formed. Thus, by suitable choice of temperature and pressure during the reaction as well as suitable choice of reaction component. If the isocyanates split off are expected to be relatively high boiling monoisocyanates, then high boiling polyisocyanates such as 4,4'-diphenylmethane diisocyanate should be introduced and the process should be carried out at elevated temperatures up to about 250° C. and preferably at reduced pressure. If, on the other hand, the monoisocyanates are expected to have boiling points below about 100 to about 150° C. at atmospheric pressure, for example, then the choice of suitable polyisocyanate is greater and operating temperatures of about 150 to 180° C. will be sufficient, but even in this case it will be advantageous to employ reduced pressure.

The monoisocyanates may also be removed by an inert carrier gas such as nitrogen which is conducted through the reaction mixture during the splitting reaction which takes place at elevated temperatures, the monoisocyanates being thereby removed. This process can be used successfully for low boiling aliphatic alkyl isocyanates which preferably have boiling points below about 100° C.

Any suitable primary monoamines may be used such as, for example, methylamine, ethylamine, propylamine, isopropylamine, butylamine, isobutylamine, tertiary butylamine, dodecylamine, allylamine, 3-methoxy-propylamine, cyclohexylamine, benzylamine, aniline, o-, m-, and p-toluidine, p-methoxy-aniline, and p-chloroaniline. It is particularly advantageous to use saturated or unsaturated alkylamines with 1 to 6 carbon atoms.

Instead of the free primary monoamines one may also use masked amines, for example, their salts with carbonic acid, fumaric acid, acetic acid, trichloroacetic, or oxalic acid.

According to Angewandte Chemie, 7, page 1002, amines are reacted with isocyanates, the intermediate N,N'-di- or trisubstituted ureas splitting in a manner analogous to ester interchange reactions, the easily volatile monoisocyanates dissolving out in the process. End products of this method are thus low boiling monoisocyanates and di- or trisubstituted ureas, whereas according to the invention the main product consists of polyisocyanates with more than three —NCO groups in the molecule and with biuret structure, and low boiling monoisocyanates are obtained at the same time as by-products.

Any suitable organic polyisocyanates may be used. Diisocyanates which can be used as starting materials either alone or in admixture with each other in the process of the invention are, for example, those whose —NCO groups have equal reactivity, as for example, tetramethylene diisocyanate, hexamethylene diisocyanate, cyclohexane-1,4-diisocyanate, dicyclohexylmethane - 4,4' - diisocyanate, m-xylylene diisocyanate, p-xylylene diisocyanate, m-phenylene diisocyanate, p-phenylene diisocyanate, diphenylmethane-4,4'-diisocyanate, diphenyldimethylmethane - 4,4' - diisocyanate, 3,3'-dimethoxydiphenylmethane-4,4'-diisocyanate and the like. Diisocyanates whose —NCO groups differ in their reactivity, for example, 1-methylbenzene-2,4-diisocyanate, 1 - methylbenzene-2,6-diisocyanate, 1-chlorobenzene-2,4-diisocyanate, 3-methyldiphenylmethane - 4,4' - diisocyanate, 1-methylcyclohexane-2,4-diisocyanate, 1-methylcyclohexane-2,6 - diisocyanate and the like are also very suitable. Also suitable are the perchlorinated arylisocyanates such as perchloro-m-phenylene diisocyanate or 1-methyl-3,5,6-chlorobenzene-2,4-diisocyanate. Also suitable are phosphoric acid aryl ester isocyanates as described in Belgian patent specification 575,407 for example, phosphoric acid-tri-(4-isocyanate-phenylester).

Suitable for use as triisocyanates are, for example, 1-methylbenzene - 2,4,6 - triisocyanate, diphenylmethane-2,4,4'-triisocyanate, 3-methyl-diphenylmethane - 4,6,4'-triisocyanate and triphenylmethane-4,4',4''-triisocyanate.

All of the above mentioned polyisocyanates are obtainable by phosgenating the corresponding amines. High molecular weight reaction products of the said polyisocyanates such as obtained, for example, when compounds containing hydroxyl groups are reacted with excess polyisocyanate should not be used for the preparation of the biuret polyisocyanates.

For carrying out the process, the primary monoamine is preferably added to the polyisocyanate in such proportions that the —NCO to —NH₂ ratio is at least three. As the reaction of isocyanate with an amine generally takes place extremely rapidly and exothermically, this stage of the reaction may be carried out at room temperature or below it or, of course, also at elevated temperatures. It is preferred to introduce the amines in the gaseous state into the polyisocyanate, preferably together with a carrier gas such as nitrogen. After the introduction of the amine, the reaction thereof with the polyisocyanate in accordance with the quantities used, for example to form a urea isocyanate or a di- or triurea is completed at the same time. If the whole quantity of polyisocyanate corresponding to the final equilibrium desired is present, then the said intermediate products, particularly at elevated temperatures, are directly converted to the biuret polyisocyanates but still contain the amine components. The required polyisocynates with biuret structure are then formed by splitting off the monoisocyanate. This last stage of the process always takes place at elevated temperatures, preferably at about 120 to about 250° C. If the process is carried out from the start at the temperature required for the splitting reaction, which temperature varies quite considerably, of course, with the constitution of the polyisocyanate used and the amine, then all the reaction stages will take place, there being a smooth transition from one stage to the next, and biuret polyisocyanates and monoisocyanates will be formed immediately. This method of carrying out the process is generally preferred.

The intermediate products, for example, in the above reaction scheme the disubstituted urea isocyanate (III) or the trisubstituted biuret diisocyanate (VI) or analogous intermediate products obtained when other ratios are employed, may of course, be isolated first and then be worked up with the same or with different polyisocyanates in a separate working step to obtain the products of the process.

However, even when this method is used, care must always be taken to ensure that polyfunctional isocyanates R—(NCO)$_n$, where $n$ is a number greater than 1, are reacted with the above described primary monoamines in order to obtain finally biuret polyisocyanates with more than two —NCO groups.

The reaction may be carried out in the absence of presence of solvents, but the solvents must not contain any hydrogen atoms which would react with —NCO groups. Suitable solvents are, for example, ethyl acetate, ketones, glycolmonomethyl ether aceate, chlorinated aliphatic, hydroaromatic or aromatic hydrocarbons such as methylene chloride, perchloro-cyclohexane, orthodichlorobenzene and the like. When a large excess of polyisocyanate is used as starting material, this excess may serve as solvent for the reaction products; this method has been found to be particularly advantageous.

The biuret polyisocyanate products are either solid resins or viscous liquids. Aromatic polyisocyanates generally lead to crumbly resins whereas aliphatic polyisocyanates lead to more or less viscous liquids. If the products contain portions of unreacted polyisocyanate which may have undesirable physiological effects, for example when the end products are worked up in coatings, these polyisocyanates may be removed by extraction with solvents which will not dissolve the reaction products but will dissolve the monomeric polyisocyanates. The same effect may be achieved by treating the reaction products at reduced pressure in thin layer evaporators. The reaction products are generally distinguished by their good solubility in organic solvents of the type mentioned above. They are also highly compatible with polyhydroxyl compounds normally used as complementary components, e.g. polyesters, polyethers, polythioethers or polyacetals. They are suitable for the production of coatings, flat structures, adhesives and homogeneous or porous, elastic or rigid synthetic resins. They may be used to advantage particularly in the field of foam plastics where they may be used directly in the form of solutions in monomeric diisocyanates.

It is immaterial which of the known foaming proccesses is used, e.g. the so-called direct process in which all of the foam forming components are brough together simultaneously, or a different process in which an isocyanate-containing intermediate product is first formed from the polyisocyanate with biuret structure and a subexcess quantity of a component containing a reactive hydrogen atom, this intermediate product being then reacted with another component which serves as cross-linking agent and which contains reactive hydrogen and is at least bifunctional.

In both methods, water may be used both as cross-linking and also blowing agent, or if desired, low boiling saturated or unsaturated halogenated hydrocarbons may be used as blowing agent, if desired with the use of water.

For some purposes, for example, for use as baked coatings, the products may also be used in the form of their so-called isocyanate splitting compounds, for example, in the form of their addition products with phenols, malonic acid ester, diphenlyamine and caprolactam.

Thus, the biuret polyisocyanates of the invention are useful for the preparation of polyurethane plastics which may be used to prepare insulation for either thermal or sound-proofing, for example, in the walls of a dwelling or the like. Alternately, they may be used to prepare castings such as for electrical components or for coating compositions for wood and metal and the like.

The invention is further illustrated by the following examples in which parts are by weight unless otherwise specified.

Example 1

About 2000 parts of toluylene-2,4-diisocyanate are reacted with about 66.2 parts of allylamine which is introduced as gas, together with nitrogen as carrier gas, in the course of about 45 minutes into toluylene-2,4-diisocyanate which has been heated to about 180° C. After a reaction of about 13 hours at about 180° C. in a vacuum of about 150 mm. Hg a solution of biuret polyisocyanate having an —NCO content of about 36.9 percent and a viscosity of about 152 cp./25° C. has formed with simultaneous splitting off of about 92 parts of allylisocyanate having a boiling point of about 87° C. at 760 mm. Hg.

A similar course of reaction takes place when about 103.4 parts of 3-methoxypropylamine are introduced into the reaction instead of allylamine, in which case a solution of a polyisocyanate with biuret structure in monomeric toluylene-2,4-diisocyanate with an —NCO content of about 37 percent and a viscosity of about 141 cp./25° is formed after a reaction time of about 11 hours at about 180° C. with simultaneous splitting off of about 118 parts of 3-methoxy-propylisocyanate which has a boiling point of about 49° C. at 20 mm. Hg.

Example 2

About 342.5 parts of gaseous n-propylamine together with nitrogen as carrier gas are introduced in the course of about 4 hours at about 180° C. into about 10,000 parts of toluylene-2,4- and toluylene-2,6-diisocyanate (ratio of isomers 65 to 35). The n-propylisocyanate begins to distil off before all the n-propylamine has been introduced. After a further reaction time of about 16 hours at about 180° C., the reaction being carried out in a vacuum of about 150 mm. Hg during the last five hours, a total of about 468 parts of n-propylisocyanate has collected in the cooling traps connected to the decending condenser. A solution of a biuret polyisocyanate in toluylene diisocyanate, having an —NCO content of about 37.1 percent and a viscosity of about 109 cp./25° C. remains behind in the reaction vessel.

A similar reaction is observed when pure toluylene-2,4-diisocyanate is used.

Example 3

About 2,000 parts of toluylene-2,4-diisocyanate are reacted with about 84 parts of isobutylamine at about 180° C. The introduction of the amine into hot toluylene-2,4-diisocyanate is carried out in the course of about 1½ hours, using nitrogen as carrier gas. When the addition is completed, the reaction mixture is heated for approximately another 2¾ hours at about 180° C. at a reduced pressure which is finally 110 mm. Hg. At the end of this time a solution of a biuret polyisocyanate in toluylene 2,4-diisocyanate, having an —NCO content of about 37.5 percent and a viscosity of about 95 cp./25° C. has formed. At the same time, about 106 parts of isobutyl isocyanate are recovered.

Use of the reaction product of Example 3.—The solution of the polyisocyanate with biuret structure in toluylene-2,4-diisocyanate is eminently suitable for the production of a foam plastic. For this purpose, about 635 parts of the said solution are reacted for one hour at about 180° C. with about 365 parts of a branched polypropylene glycol ether (OH number 56) obtained from trimethylolpropane and propylene oxide. The reaction mixture now has an —NCO content of about 22.9 percent and a viscosity of about 710 cp./25° C. When about 100 parts of this intermediate product, which contains isocyanate, is intimately mixed with a solution of 5 parts of water, 0.5 part of 1,4-diaza-dicyclo-(2,2,2)-octane and 1 part of polysiloxane-alkylene oxide copolymer having the formula

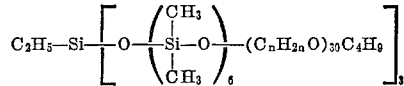

wherein ($C_nH_{2n}O$) is a mixed polyoxyethylene and oxypropylene block copolymer containing about 17 oxyethylene units and about 13 oxypropylene units, as stabilizer, then the mixture, which immediately becomes creamy, begins to foam and soon solidifies to an extremely finely porous, semi-rigid foam plastic having a density of about 11 kg./m³.

Example 4

About 78.6 parts of n-propylamine and nitrogen as carrier gas are introduced at about 180° C. in the course of about 80 minutes into about 1,000 parts of diphenylmethane-4,4'-diisocyanate, and the reaction mixture is then heated for a further hour at the same temperature but at a reduced pressure of about 100 mm. Hg. About 102 parts of n-propylisocyanate are collected in the cold traps connected to the apparatus. The polyisocyanate with biuret structure, which is poured hot into a can, solidifies to a brittle resin which easily breaks to pieces under impact. It is practically insoluble in the usual solvents for isocyanates, such as acetone, ethyl acetate, or methyl glycol ether acetate but soluble in dimethylformamide.

Similar products are obtained when a diisocyanate mixture of about 2 mols of diphenylmethane-4,4'-diisocyanate and about 1 mol of toluylene-2,4-diisocyanate is reacted with about 1 mol of n-propylamine. After the splitting off of about 105 parts of n-propylisocyanate in the course of three hours at about 180° C., a biuret polyisocyanate having an —NCO content of about 18.8 percent is obtained. It is a crumbly resin which is difficulty soluble in the usual solvents for isocyanates.

Example 5

About 59 parts of n-propylamine are introduced in the course of about 35 minutes into about 3,000 parts of diphenylmethane-4,4'-diisocyanate heated to about 110° C., using nitrogen as carrier gas. At a reduced pressure of about 100 mm. Hg, the temperature of the reaction mixture is first raised to about 180° C. and then for 30 minutes, to about 220° C. After a total reaction time of 90 minutes calculated from the end of the addition of amine, about 77 parts of n-propylisocyanate have collected in the cold traps connected to a descending cooler. The remaining solution of a polyisocyanate with biuret structure in monomeric diphenylmethane-4,4'-diisocyanate has an —NCO content of about 26.0 percent and a viscosity of about 480 cp./50° C. In contrast to diphenylmethane-4,4'-diisocyanate, which crystallizes, the solution remains liquid even when left to stand for a considerable time at room temperature.

Example 6

A solution of about 185 parts of dodecylamine in about 740 parts of benzene are added dropwise with stirring, in the course of about 45 minutes, to about 2500 parts of diphenylmethane-4,4'-diisocyanate heated to about 80° C. The temperature is continuously increased, first to about 180° C. and then to about 220° C., the benzene used as solvent for the amine being thereby distilled off. The process is then continued at reduced pressure which finally falls to about 20 mm. Hg. After about 2 hours calculated from the end of the addition of amine, about 137 parts of dodecylisocyanate of boiling point about 148 to about 150° C. at 15 mm. Hg. distill over on the ascending cooler. A slightly colored residue having an —NCO content of about 22.2 percent remains behind. This residue remains liquid even when left to stand for some time at room temperature. It is a solution of a biuret polyisocyanate in monomeric diphenylmethane-4,4'-diisocyanate.

If a solution of about 107 parts of benzylamine in about 428 parts of benzene is used in the same way instead of dodecylamine, then a biuret polyisocyanate is monomeric diphenylmethane-4,4'-diisocyanate, having a viscosity of about 710 cp./50° C. and an —NCO value of about 23 percent, and at the same time about 114 parts of benzyl isocyanate of boiling point about 89° C. at 15 mm. Hg are obtained.

Example 7

About 31 parts of methylamine are introduced in the course of about 60 minutes into about 1344 parts of hexamethylene diisocyanate heated to about 160° C., nitrogen being used as carrier gas. After about 35 minutes and while methylamine is still being introduced, the methylisocyanate begins to distill off. When all the amine has been added, the reaction mixture is heated for about 2½ hours at about 180° C. at a reduced pressure of about 200 mm. Hg, and then for approximately another 2½ hours at about 200° C. At the end of this reaction time, about 53 g. of methylisocyanate have collected in the cold traps which are cooled to about —70° C. A yellow colored liquid having an —NCO content of about 37.6 percent and a viscosity of about 23 cp./25° C. remains behind in the reaction vessel. It is a solution of a biuret polyisocyanate in monomeric hexamethylenediisocyanate.

When the hexamethylenediisocyanate has been distilled off in a vacuum of about 0.2 mm. Hg and at an internal temperature of at the most about 150° C., a yellowish colored biuret polyisocyanate and having an —NCO content of about 21.5 percent and a viscosity of about 10,850 cp./25° C. is obtained.

Use of the reaction product of Example 7.—About 60 parts of a 75 percent solution in ethyl ethylene glycol ether acetate of this polyisocyanate are mixed with about 100 parts of a 50 percent solution in ethyl ethylene glycol ether acetate and methyl ethyl ketone of a polyester obtained from phthalic acid and trimethylolpropane and having an hydroxyl content of about 8 percent and with about 0.15 part of zinc octoate. When this mixture is applied in the form of a thin layer on surfaces, hard, glossy coatings which do not yellow under the influence of light are formed at room temperature in the course of about 24 hours.

Example 8

About 73 parts of gaseous tertiary butylamine together with nitrogen as carrier gas are introduced in the course of about 75 minutes into about 1680 parts of hexamethylene diisocyanate heated to about 180° C. Tertiary butyl isocyanate begins to distill off even before all the tertiary butylamine has been introduced. After the introduction of the amine, heating is continued at the same temperature and under a reduced pressure of about 200 mm. Hg, tertiary butyl isocyanate being obtained in a yield of about 85 percent calculated on the tertiary butylamine used. The —NCO value of the reaction mixture falls continuously to a final value of about 38.2 percent in the course of a total reaction time of about 13 hours. This —NCO value is further reduced after heating for approximately another 11 hours at about 180° C. After cooling, a moderately viscous liquid is obtained which consists of biuret polyisocyanate dissolved in monomeric hexamethylene diisocyanate.

By treatment in a thin layer evaporator, the monomeric hexamethylene diisocyanate can be removed at a temperature of about 200 to 210° C. The biuret polyisocyanate is obtained as highly viscous, yellow liquid.

It is to be understood that the foregoing examples are given for the purpose of illustration and that any other suitable organic polyisocyanate, monoamine, solvent, carrier gas or the like may be used provided that the teachings of this disclosure are followed.

Although the invention has been described in considerable detail in the foregoing, it is to be understood that such detail is solely for the purpose of illustration and that variations can be made by those skilled in the art without departing from the spirit and scope of the invention except as set forth in the claims.

What is claimed is:

1. A process for the preparation of a biuret polyisocyanate which comprises reacting a monomeric primary monoamine having from 1 to 6 carbon atoms with a monomeric organic diisocyanate in such proportions that the ratio of —NCO to —NH$_2$ is at least about 6 while heating the reaction mixture to an elevated temperature above about 150° C. and above the boiling point of the resulting monoisocyanate containing from 1 to 6 carbon atoms exclusive of the —NCO group while continuously removing said monoisocyanate from the reaction mixture substantially as soon as it is formed.

2. A process for the preparation of a biuret polyisocyanate which comprises reacting an alkyl primary monoamine having 1 to 6 carbon atoms with a monomeric diisocyanate containing 6 to 17 carbon atoms in such proportions that the —NCO to —NH$_2$ ratio is at least 3 at a temperature of from about 150 to about 250° C. to produce said biuret polyisocyanate and an alkyl monoisocyanate, the alkyl radical of which corresponds to the alkyl radical of said alkyl amine, said monoisocyanate having a boiling point below about 100° C., and removing said alkyl monoisocyanate from the reaction mixture substantially as soon as it is formed.

3. A process for the preparation of a biuret polyisocyanate which comprises reacting an primary monoamine having from 1 to 6 carbon atoms with a mixture of a major proportion of a monomeric organic diisocyanate and a minor proportion of an organic triisocyanate as the sole isocyanates in said reaction mixture and in such proportions that the —NCO to —NH$_2$ ratio is at least 3 while heating said reaction mixture to a temperature of at least about 150° C. and above the boiling point of the resulting monoisocyanate containing 1 to 6 carbon atoms while removing said monoisocyanate substantially as soon as it is formed.

4. A method of simultaneously producing a biuret polyisocyanate having the formula

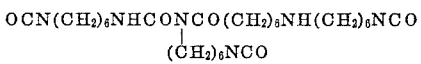

and a monoisocyanate having the formula R—NCO which comprises reacting hexamethylene diisocyanate with a primary monoamine having the formula RNH$_2$ wherein R is an organic radical having 1 to 6 carbon atoms in such proportions that the —NCO to —NH$_2$ ratio is about 3 while heating the reaction mixture to an elevated temperature above about 150° C. while continuously removing the R—NCO substantially as soon as it is formed.

References Cited

Wagner: Angewandte Chemie, vol. 74, July-Dec. 1962, pages 799–801.

Bunge: Angewandte Chemie, vol. 72, July-Dec. 1960, page 1002.

CHARLES B. PARKER, *Primary Examiner.*

JOSEPH P. BRUST, *Examiner.*

D. H. TORRENCE, *Assistant Examiner.*